Feb. 18, 1969 W. J. KELLY ETAL 3,427,865
TESTING DEVICE FOR ANTIFRICTION BEARINGS OR THE LIKE
Filed Aug. 2, 1965 Sheet 1 of 9

INVENTORS
WILLIAM J. KELLY
DUDLEY V. BICKFORD
BY
Hopgood & Calimafde
ATTORNEYS

Feb. 18, 1969  W. J. KELLY ET AL  3,427,865
TESTING DEVICE FOR ANTIFRICTION BEARINGS OR THE LIKE
Filed Aug. 2, 1965

INVENTORS
WILLIAM J. KELLY
DUDLEY V. BICKFORD
BY Hopgood & Calimafde
ATTORNEYS

Fig. 19.

Feb. 18, 1969    W. J. KELLY ET AL    3,427,865
TESTING DEVICE FOR ANTIFRICTION BEARINGS OR THE LIKE
Filed Aug. 2, 1965

Fig. 21.

DRAFT

| Signal | Cycle |
|---|---|
| LS1A (2) SPINDLE 28 BACK | |
| LS1B (6) SPINDLE 28 BACK | |
| LS1C (11) SPINDLE 28 BACK | |
| LS2 (2) PUSHER 17 IN POS. 2 OR 3 | |
| LS4A (6) LOAD ARM 12 BACK | |
| LS4B (7) LOAD ARM 12 BACK | |
| R1 (1) | |
| VS6 (7) PUSHER TO POS. 2 | |
| VS7 (7) PUSHER TO POS. 3 | |
| LS5 (6) PUSHER IN POS. 3 | |
| R6 (7) | |
| R3 (2) CYCLE START | |
| VS1 (10) LOAD ARM TO FORWARD POS. | |
| LS6 (9) LOAD ARM IN FORWARD POS. | |
| R7 (9) | |
| VS3 (4) SPINDLE TO FORWARD POS. | |
| LS3 (6) SPINDLE IN FORWARD POS. | |
| R5 (6) | |
| VS4 (6) PICKUP PU MOVES DOWN | |
| VS2 (6) OUTER THRUST LEFT (20L) | |
| TR4 (12) 3-SECOND DELAY | |
| TR5 (12) 4-SECOND DELAY | |
| TR2 (13) ½ SECOND DELAY | |
| R8 (10) METER MR TEST | |
| MRa (METER ARM CONTACTS) | |
| R4 (5) | |
| VS5 (5) OUTER THRUST RIGHT (20R) | |
| R10 | |
| TR3 ½ SECOND DELAY | |
| IF BEARING UNACCEPTABLE | |
| MRa (METER ARM CONTACTS) | |
| R11 (14) | |
| R9 (11) | |
| VS8 (11) REJECT | |
| TR6 (11) ½ SECOND DELAY | |

INVENTORS
WILLIAM J. KELLY
DUDLEY V. BICKFORD
BY Hopgood & Calimafde
ATTORNEYS

United States Patent Office 3,427,865
Patented Feb. 18, 1969

3,427,865
TESTING DEVICE FOR ANTIFRICTION
BEARINGS OR THE LIKE
William J. Kelly, New Britain, and Dudley V. Bickford,
Berlin, Conn., assignors, by mesne assignments, to Textron, Inc., Providence, R.I., a corporation of Delaware
Filed Aug. 2, 1965, Ser. No. 476,330
U.S. Cl. 73—67                                   27 Claims
Int. Cl. G01n 29/00; G01m 7/00

ABSTRACT OF THE DISCLOSURE

The present invention provides a novel shop machine for automatically testing bearings for vibration. The novel machine is capable of testing a bearing under stress at either side without requiring reversal of the bearing relative to the stressing means. The machine automatically separates the bearings which exhibit passable vibration from those which exhibit vibration exceeding a chosen norm. The utility of the machine is enlarged by enabling it to operate on bearings of various sizes and for this purpose changeable tooling is provided. The machine operates at high speed and can run through a bearing lot rapidly and the next lot may consist of bearings of a different size. Accordingly, to save productive machine time, quick-change tooling, involving novel features, is provided.

---

This invention relates to apparatus for operating on bearing workpieces, to tooling in such apparatus, and more particularly to a machine for automatically testing bearings, especially ball bearings.

When one ring, or race, of a ball bearing or the like is spun and the other ring stressed, the sound of the bearing resulting from its vibration is a measure of the refinement or quality of the bearing. Known equipment for automatically testing bearings for vibration is complicated and involves testing of the bearing with one side toward stressing mechanism and then reversal of the bearing to face its other side toward the stressing mechanism.

The present invention provides a novel shop machine for automatically testing bearings for vibration. The novel machine is capable of testing a bearing under stress at either side without requiring reversal of the bearing relative to the stressing means. The machine automatically separates the bearings which exhibit passable vibration from those which exhibit vibration exceeding a chosen norm. The utility of the machine is enlarged by enabling it to operate on bearings of various sizes and for this purpose changeable tooling is provided. The machine operates at high speed and can run through a bearing lot rapidly and the next lot may consist of bearings of a different size. Accordingly, to save productive machine time, quick-change tooling, involving novel features, is provided.

In pursuance of its objectives, the invention involves various novel subcombinations, features of construction, arrangement of parts, and steps of operation, as will become clear from the drawings and description of a preferred form of the machine, and from the claims. It is understood that various modifications may be made in the preferred form and its parts and sequence of operation, without departing from the spirit of the invention.

In the drawings:

FIG. 1 is a plan view of the pertinent machinery, omitting certain parts for the sake of clarity of showing;

FIG. 1A is a detail section on line 1A—1A of FIG. 1;

A brief description of the machine is given first, below, with particular reference to FIGS. 1 and 2.

The machine has an upper base frame F, partially shown on which is a motor M1 for spinning an arbor 10 about a work axis. The arbor includes a concentric clamp element 10a for a side of the inner ring of a bearing workpiece B (also see FIG. 3) to be set on the arbor. Concentric about the work axis and facing the arbor 10 and clamp element 10a is a freely rotatable, axially shiftable opposing clamp member 11, shown in advanced position. A bearing is brought to coaxial position between the arbor and the clamp member 11 while the clamp member is in retracted position. The clamp member is then advanced to abut one side of the inner ring of the bearing and force the bearing onto the arbor until the opposite side of the inner ring is firm against the clamp element 10a of the arbor. The bearing is then in test position, spinning around the work axis together with the arbor.

The bearing is brought to position between the clamp member 11 and the arbor 10 by a carrier movable transversely of the work axis. In the illustrative machine, the carrier is a load arm 12 slidably movable at a right angle to the work axis and provided at the leading end with a bearing holder 13 having a C-form pocket, open at the front and at the sides, for cupping a bearing with its axis parallel to the work axis. Movement of the load arm 12 from rear position, shown in FIGS. 1 and 2, to forward position brings the bearing in holder 13 to work axis-alinement between clamp member 11 and the arbor. Advance of the clamp member then pushes the bearing endwise completely out of the load arm and onto the arbor, after which the load arm may return to the rear. The front opening of the bearing holder 13 permits retreat of the load arm from forward position even though the clamp member 11 may be reaching through the bearing holder into engagement with the bearing on the arbor.

Load arm 12 receives a bearing from a stationary cup member 14 located to one side of the load arm and at the lower end of a gravity chute 15 (also see FIG. 15) adapted to be loaded with a single line of bearings to be worked on. Cup member 14 has an upwardly open C-form pocket for cupping a bearing with its axis parallel to the work axis; the bearings in chute 15 are in similar disposition and the bottom one drops into the cup member. The pocket of the cup member 14 is fully open at the side adjacent the load arm and at least accessibly open at the opposite side. When the load arm is in its rear position, the pocket of bearing holder 13 is in side-by-side alinement with the pocket of cup member 14. The bearing in the pocket of the cup member may then be transferred endwise into the then-empty pocket of the holder 13 by the advance of a pusher 17 on a plunger 16 to a front position, such as indicated in FIG. 1.

After the bearing has been set in test position, its inner ring spinning with arbor 10 and axially confined between clamp elements 10a and 11, the bearing is automatically tested for vibration, first under outer ring thrust loading at one side and then at the other. The bearing "sound" or vibration is gauged by electrical means which includes a commercially available transducer, preferably a piezoelectric accelerometer type pickup PU. Directly after the bearing is set in test position, the pickup PU moves into sensing engagement with the periphery of the outer ring of the bearing. At about the same time, an outer thrust member 20L moves to the left (from the viewpoint of FIG. 1) and applies thrust force against the right side of the outer bearing ring. The resulting bearing vibration, as electrically manifested, is sampled during a first readout interval. If the bearing vibration is excessive, the bearing is ejected from test position and the machine does not test for bearing vibration under outer ring thrust at the left side. But if the bearing vibration is found passable during the first readout interval, the bearing remains in the same test position and the machine automatically proceeds to test for bearing vibration under thrust against the left side of the outer bearing ring. The outer thrust member 20L retreats and an opposite outer thrust member 20R moves to the right to apply a thrust force against the left side of the outer bearing ring. The bearing vibration, as electrically manifested, is again sampled, during a second readout interval. After the second readout interval, the following automatic sequence takes place: pickup PU moves away from the bearing, outer thrust member 20R retreats, inner ring clamp member 11 is retracted, and outer ring thrust member 20L again moved to the left. This time, since clamp member 11 is out of the way, the outer thrust member 20L knocks the bearing off the arbor 10 and into upper delivery chute section 22. As will be brought out later, this same sequence is automatically initiated directly after the first readout interval if the bearing vibration is found unacceptable during that interval.

Figure 16:
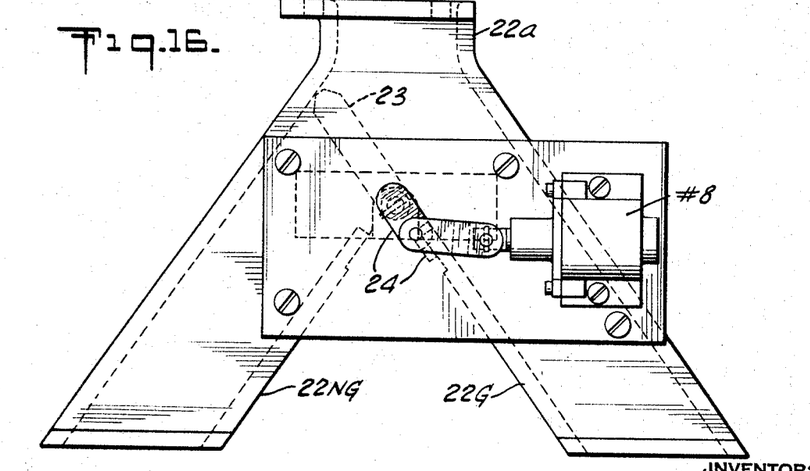
FIG. 16 is a rear view of a separator section of a receiving chute for bearings ejected from work position.

Below the upper section 22 of the delivery chute is a separator section 22a (also see FIG. 16) with diverging delivery passages 22G and 22NG. A pivoted deflector 23 when in shown position opens passage 22G and shuts passage 22NG. If the bearing is found acceptable during both readout intervals, the deflector remains in shown position and guides the bearing from the upper chute section 22 into the passage 22G, but if the bearing vibration is found unacceptable during either the first or the second readout interval, the vibration gauging means brings into operation means, including a linkage 24, for actuating the deflector to reject position in which it shuts the passage 22G and opens the passage 22G to receive the bearing.

Figures 2, 4, 4A, 5, 6:
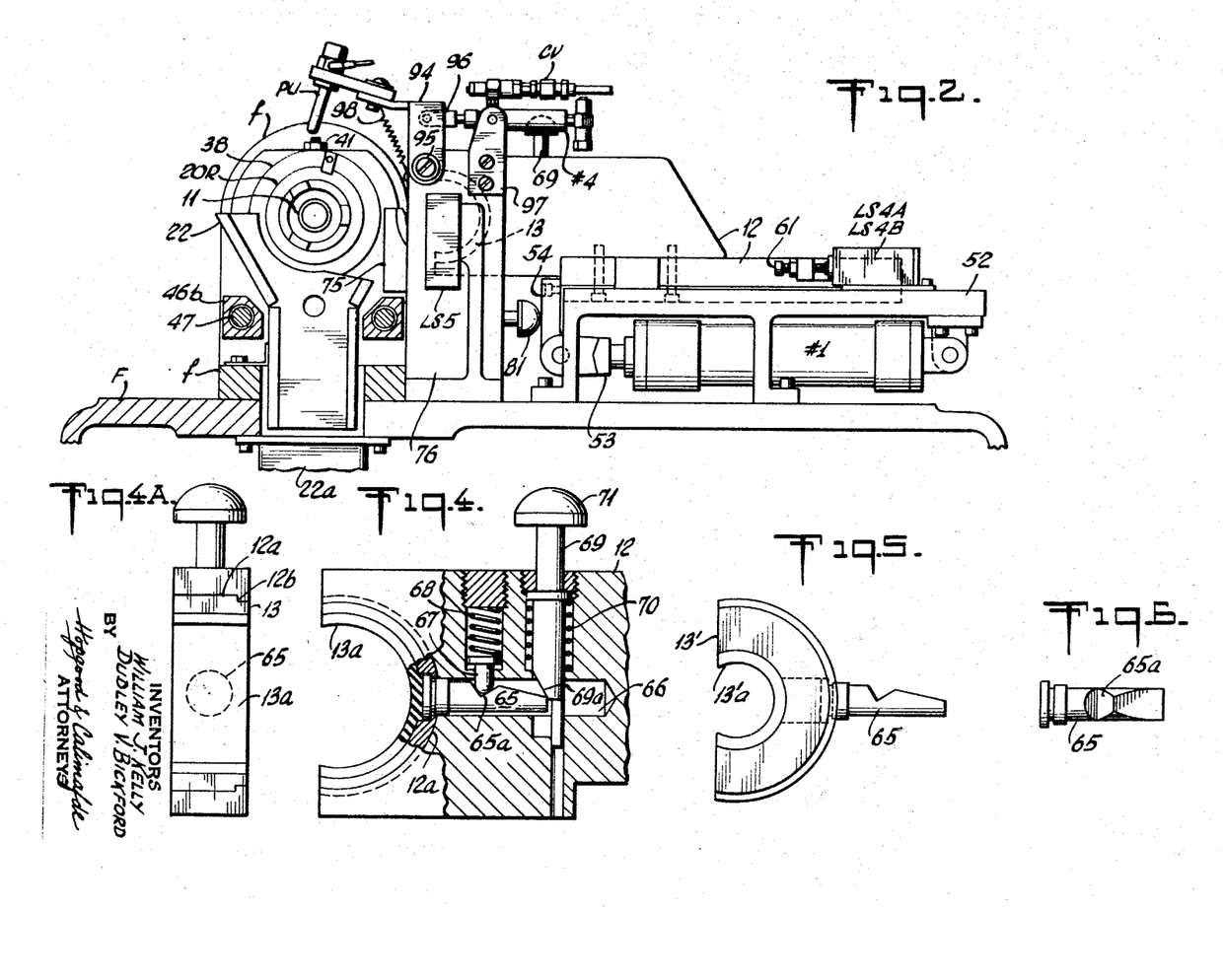
FIG. 2 is a side sectional view through the apparatus of FIG. 1.
FIG. 4 is an enlarged fragmentary side view, partly sectioned, of a bearing carrier or load arm, of the apparatus, as fitted with a bearing holder for a given diameter of bearing.
FIG. 4A is a front end view of the load arm and bearing holder of FIG. 4.
FIG. 5 is a side view of a bearing holder for a smaller diameter of bearing.
FIG. 6 is a plan view of a bearing holder tail.

It may be noted, now, that the two mounted outer thrust members 20L and 20R are entirely similar and interchangeable and have been differently designated in FIGS. 1 and 2 and other figures merely for purposes of explanation.

Figure 19:
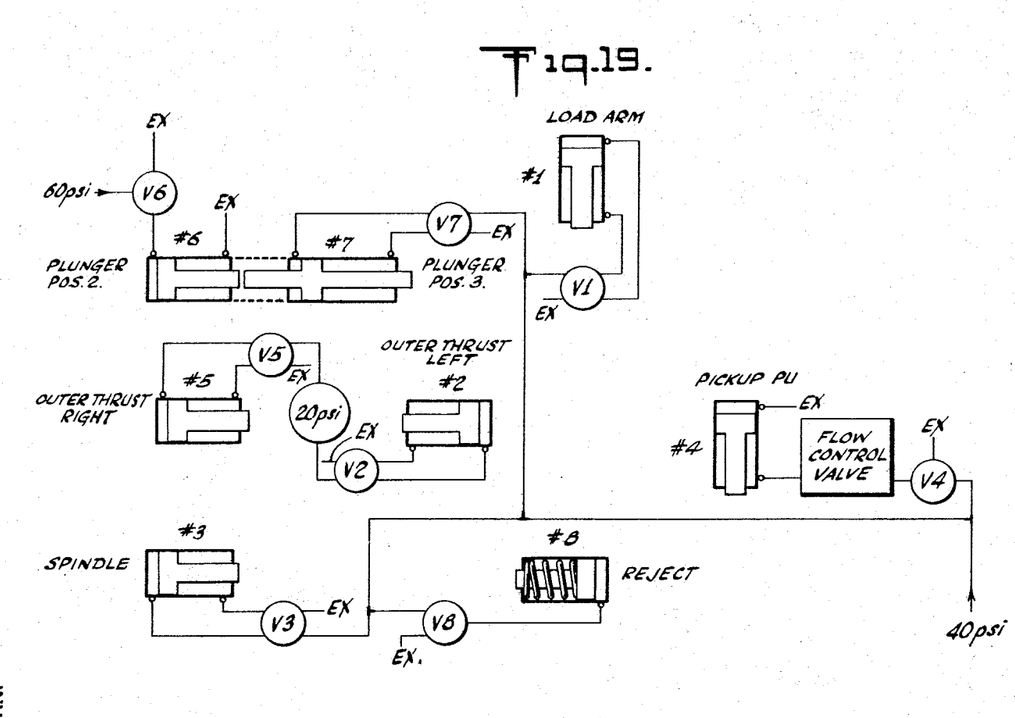
FIG. 19 is a schematic view of the pneumatic system used in the machine for actuating two-way elements of the machine.

The mentioned two-way movable elements are conveniently actuatable by fluid-responsive means, air being the preferred fluid. The fluid-responsive means comprises known forms of air cylinders and associated solenoid-operated valves between cylinder chambers and sources of air pressure. The pneumatic system is schematically shown in FIG. 19 where the noted pressures are merely illustrative. There are eight cylinders designated #1 to #8 which will be discussed in the detail description of the machine given below. Atmospheric pressure is denoted in FIG. 19 by EX. The valves V1 to V8 which are respectively associated with cylinders #1 to #8 are operated by valve solenoids designated VS1 to VS8 in the circuit diagram, FIG. 20. The piston positions indicated in FIG. 19 are those existing when the valves are in their normal, unoperated states. Operation of a valve by the related solenoid will result in changing the pressure differential in the associated cylinder so as to drive the piston to its alternative position in the cylinder.

It is desirable that each particular machine for servicing bearings be capable of handling a range of different sizes of bearings. In order for the machine to handle different sizes of bearings, changeable tooling is used, this tooling here comprising the arbor 10, inner ring clamp member 11, bearing holder 13, cup member 14, supply chute 15, plunger or pusher head 17 and the pair of outer ring thrust members 20. Further, the machine operates at high speed and will run through a bearing lot rapidly and the next lot may have bearings of a different size. Therefore, to minimize the loss of productive machine time, provision is made for quick change of the tooling.

The arbor 10 (FIGS. 1 and 3) for each different diameter or width of bearing has a metal body with a reduced forward portion on which is bonded a flanged collar of non-abrasive, resilient material such as, for instance, a suitable grade of urethane. The collar flange constitutes the clamp elements 10a of the arbor. Collar hub 10b mounts the bearing in work position; specifically, the test position, and has a beveled front edge to facilitate and guide the insertion of the bearing onto the hub. The hub extends deeply into the center hole of the bearing and has a diameter consistent with that of the center hole but preferably slightly larger, as permitted by the resiliency of the hub material, so that the bearing will have a tight fit on the hub. The flange 10a of the arbor is so located laterally that when the bearing is on the arbor hub 10b and the inner ring is against the flange, the left side of the bearing (from the viewpoint of FIGS. 1 and 3) is just to the right of the path of the load arm 12. In this location of the bearing, its outer periphery is in proper lateral relation to the locus of the pickup PU, and the pickup will engage the periphery well within its width. For the range of bearing widths to be handled by the machine, the engagement of the pickup with the bearing periphery will be substantially midway of its width, and it is obvious that the pickup can be mounted for a degree of lateral adjustment if a precise midway engagement of the pickup with the bearing periphery is desired.

Figure 3:
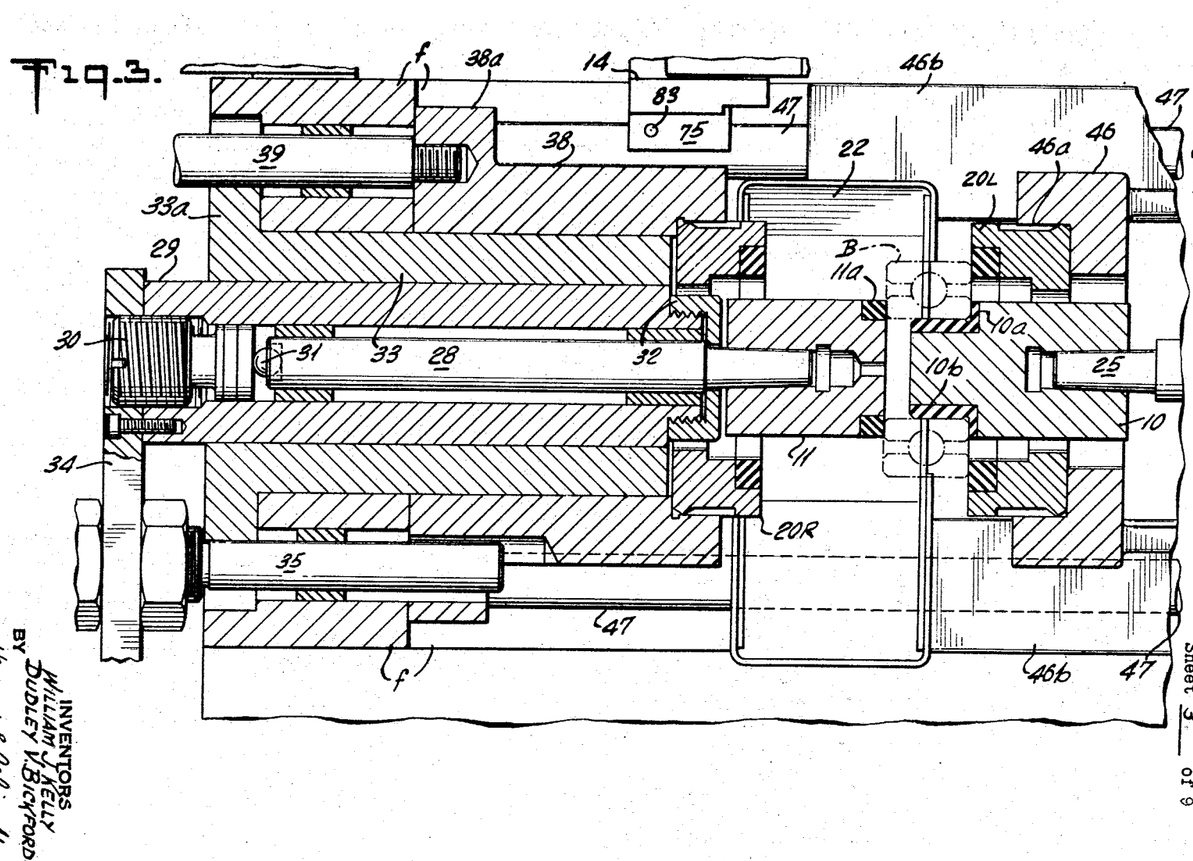
FIG. 3 is an enlarged fragmentary plan section taken through the test or work axis of the apparatus.

The rear portion of the arbor is centrally reamed with a tapered hole for drive-receiving fit on the tapered end of a shaft 25 driven by the spin motor M1. With the aid of a suitable knock-off tool, the arbor can be quickly dismounted. Another arbor, dimensioned for a different bearing size can then be quickly force-fitted to the motor shaft 25 for rotation thereby.

The inner ring clamp member 11 is similarly force-fitted on the tapered forward end of a free-running spindle 28 which extends along the work axis. Member 11 has a cylindrical metal body with a stepped-down front on which is bonded an annulus 11a of the mentioned resilient material. The annulus face is adapted to engage the presented side of the inner bearing ring and has an outside diameter matching that of the inner ring clamp element 10a of the same tool set, this diameter being consistent with the requirement that the inner ring clamping means do not engage the outer bearing ring. The inside diameter of annulus 11a should be safely smaller than the inside diameter of the inner ring sides so that the inner ring will be engaged at the side presented to member 11 only with the resilient material of annulus 11a. The spindle 28 is journaled in a round tube 29 which, at the rear, has threaded therein an adjustable thrust assembly 30 engaged with a ball 31 set into the back end of the spindle. A retainer nut 32 on the reduced front end of tube 29 abuts a shoulder of the spindle, restraining forward displacement of the spindle relative to the tube without interfering with spindle rotation. The tube 29 is translationally slidable within a stationary bushing 33 which has a rear flange 33a suitably secured to the left hand standard of an auxiliary, generally U-form frame f fixed on main base frame F. An arm 34 yokes the tube 29 to piston rod 35 of cylinder #3. When the associated valve V3 (FIG. 19) is actuated, the pressure differential in cylinder #3 is reversed, whereupon piston rod 35 acts through arm 34 and tube 29 to advance spindle 28 and the clamp member 11 carried thereby, so that the bearing in load arm 12 is forced into test position on the arbor 10.

The equal, opposite thrusts of the parts 11 and 10a on the inner ring in test position, aided by a tight fit of the ring on arbor hub 10b, compel the ring to rotate true with the arbor. The clamp member 11 and the spindle 28, of course, rotate freely with the inner bearing ring.

It is to be noted that the inner ring of the bearing in test position is engaged only with resilient or rubber-like material; that of the clamp annulus 11a, the clamp element 10a and the arbor hub 10b. The resilient mounting and engagement of the inner ring in test position cushions and adequately eliminates the effect on the inner ring, hence on the entire bearing, of machine vibrations and other extraneous vibrations, without inhibiting bearing vibration under purposeful thrust applied to the outer bearing ring by either of the outer thrust members 20L and 20R.

The arm 34, which yokes piston rod 35 of cylinder #3 to the assembly of tube 29, spindle 28 and clamp member 11, carries adjustably settable screws 37a, 36b and 37. When the spindle is in rear position, screws 36a and 36b close normally open switches LS1A, LS1B and LS1C. Upon advance of the spindle, these switches open and when the spindle reaches its forward position, the screw 37 closes a normally open switch LS3.

The outer thrust member 20R is removably mounted, in a manner explained later, in a front socket of a holder 38. The holder has a cylindrical body slidably fitted on fixed bushing 33. A rear flange 38a of holder 38 has a tapped hole receiving the threaded end of piston rod 39 of cylinder #5. On actuation of the valve V5 (FIG. 19), the pressure differential in the cylinder is reversed, whereby cylinder drives the piston rod 39 forwardly and the holder 38 is thereby moved to advance the thrust member 20R for applying thrust force against the left side of the outer bearing ring in test position. It is evident that the thrust force may be varied by varying the pressure differential in cylinder #5.

The outer thrust member comprises a metal ring body with an inner front recess into which is bonded an annulus 20a (also see FIGS. 8–10) made of the mentioned resilient material. The face of the annulus is formed with equally arcuately spaced ribs 20b, of appreciable thickness, which project forwardly for spaced contact with a side of the outer bearing ring when the thrust member is advanced. The resiliency of the ribs and the spaced contact thereof with the outer bearing ring afford adequate freedom for the bearing to vibrate and thus manifest its degree of refinement. For each different bearing diameter, a different pair of duplicate outer thrust members is used, one such member being identified as 20R and the other as 20L. The difference in thrust member is essentially in the radial dimensions of its annulus 20a. The inner radial size should be such that ribs 20b will safely clear the inner bearing ring; the outside radial size of the annulus is suitable to the bearing diameter, and it is permissible for the ribs to extend a short radial distance beyond the bearing periphery.

Figures 7, 8, 9, 10, 11, 12, 13:
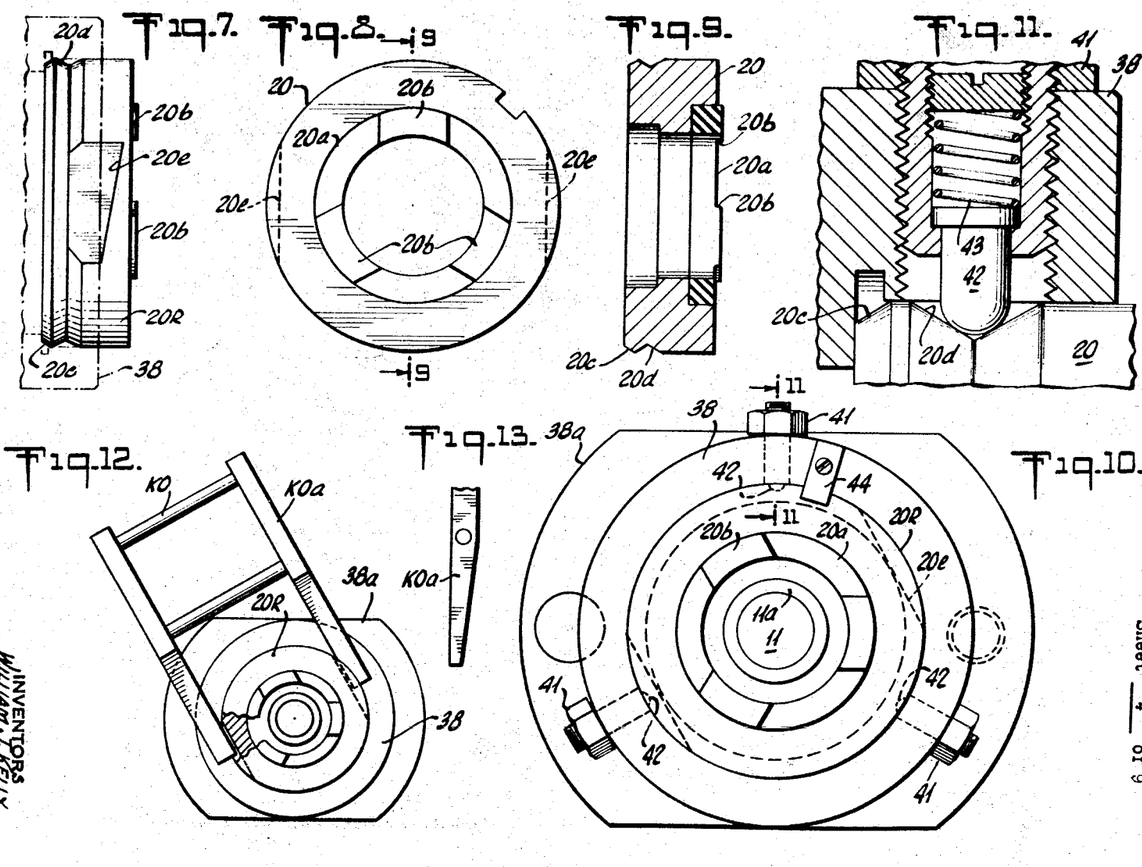
FIG. 7 is a side view of one of the outer thrust members to apply force against a side of a given diametral size of outer bearing ring in test position and also shows in phantom the front portion of a holder for the thrust members.
FIG. 8 is a face view of the thrust member of FIG. 7.
FIG. 9 is a section on line 9—9 of FIG. 8.
FIG. 10 is a face view of the thrust member as mounted in the bearing holder.
FIG. 11 is a fragmentary highly magnified section along line 11—11 of FIG. 10.
FIG. 12 is a reduced scale face view of the bearing holder and the thrust member therein and shows the manner of application of a knock-off tool to the thrust member.
FIG. 13 is a side view of the lower portion of the knock-off tool.

All the outer thrust members 20 have a body of the same length and same size and form of periphery. The outer thrust member 20R is snap-mounted in the front socket of the holder 38. As seen in FIGS. 7, 9 and 10, the periphery of thrust member 20 is formed with a beveled back edge 20c followed by a circumferential V-shaped groove 20d. The holder 38 is provided at equal spacing in the annular wall of its front socket with three radially tapped holes into which are threaded spring-plunger units, each locked in adjusted position by a nut 41. Each of these units includes a plunger 42 pressed radially inward by a spring 43. The plungers engage in the V groove 20d to lock the thrust member 20R releasably in the holder 38, preferably with the back of the thrust member against the base of the socket in the holder. It is evident that during the insertion of the thrust member, the beveled back edge 20c of the member cams the plungers 42 out of the way after which the plungers snap into the V groove 20d to retain the member in mounted position. A key 44 (FIG. 11) prevents turning of the thrust member relative to the holder 38.

To facilitate quick change of the thrust member 20, it is notched at diametrically opposite sides to form longitudinally slanted edges 20e located in front of the holder 38, as indicated in FIG. 7 which shows the front portion of the holder in phantom. When it is desired to dismount the thrust member, the operator applies a hand-held knock-off tool KO (FIG. 12) to the slanted edges 20e. The tool KO has parallel arms KOa with slanted lower portions (one of which is shown in FIG. 13) for wedging against the edges 20e of the thrust member to snap it out of the holder 38.

The outer thrust left member 20L (FIGS. 1 and 3) is mounted in the annular front socket 46a of a holder 46 which surrounds, with substantial clearance, the largest diameter arbor 10 which may be used. The socket 46a is concentric about the arbor and work axis and is the counterpart of the front socket of the holder 38. Further, the annular wall of the socket 46a also carries the same arrangement of spring-plunger units 41–42–43. Thus, any of the outer thrust members can be interchangeably mounted, in the manner previously described, in either the holder 46 or the holder 38, the thrust members respectively mounted in the holders 46 and 38 being distinguished as 20L and 20R merely for explanatory purposes.

Figure 17:
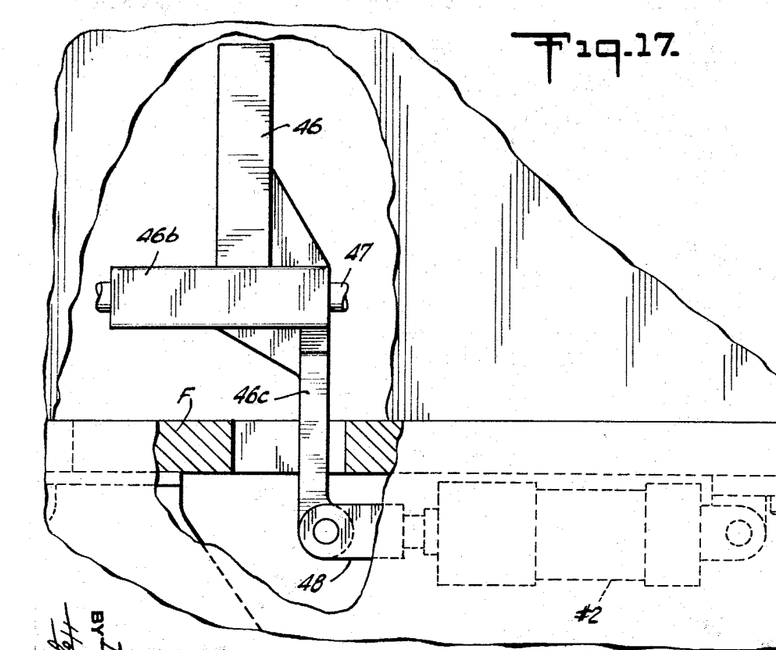
FIG. 17 is a fragmentary elevational view of a left-going holder for any of the outer thrust members.
Figure 18:
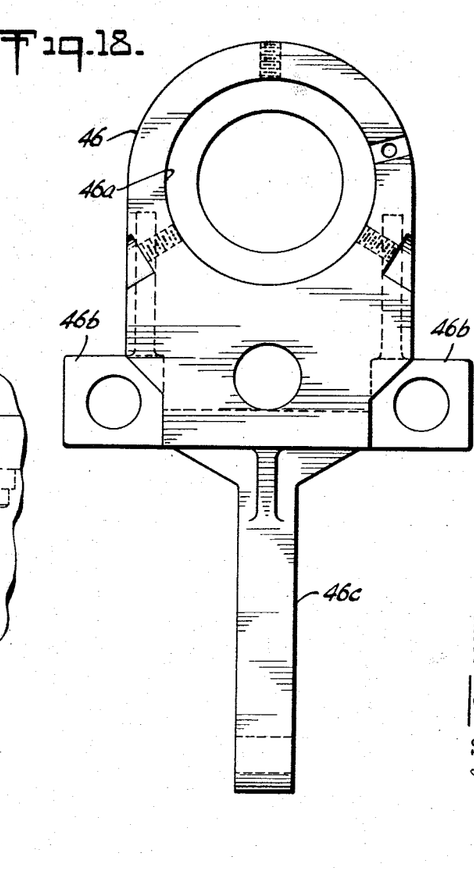
FIG. 18 is a front view of the holder of FIG. 17.

The holder 46 is the upper section of a slidable carriage which includes, at the foot of the holder, a pair of side blocks 46b (also see FIGS. 17 and 18) symmetrical with respect to a vertical center line extending the holder. The blocks 46b are smooth-bored to ride on round rails 47 disposed parallel to the work axis and mounted between the end standards of auxiliary frame f (see FIG. 1). A centrally dependent leg 46c of the carriage structure is connected to piston rod 48 of cylinder #2 hung from main base frame F, as indicated in FIG. 17. On actuation of valve V2 (FIG. 19), the direction of differential air pressure in cylinder #2 is reversed, whereby the piston rod 48 moves the carriage structure, including holder 46, forwardly to advance the outer thrust member 20L against the presented side of the outer bearing ring.

Load arm 12 (FIGS. 1 and 2) is slidable in ways of a guide beam 52 fixed through feet on base F. Hung from the beam is cylinder #3 with its piston rod assembly 53 connected by a bar 54 to the load arm, whereby actuation of valve V1 (FIG. 19) will result in the forward drive of the piston rod assembly to advance the load arm from rear position to forward position. Angle pieces 55 and 56 are attached to opposite sides of the load arm. A settable screw stop 57 on angle piece 55 abuts a block 58 on the beam 52 to stop the load arm in rear position, and the front position is established by abutment of a screw stop 59 on angle piece 56 with a block 60 on the beam. In rear position, a settable screw 61 on angle piece 56 closes a normally open double pole switch unit LS4A–LS4B mounted on the beam. When the load arm is moved to front position, a screw 62 on angle piece 55 closes a normally open switch LS6 carried on the beam.

Referring to FIGS. 4 and 4A, the front end of the load arm 12 has a forwardly facing cavity 12a defining a seat for the forwardly open bearing holder 13. A different bearing holder is used for each different diameter of bearing workpiece but all the bearing holders have the same outside size and form to fit the cavity 12a. The outside form of the bearing holder is immaterial but is conveniently a vertical C form with an arc of a little more than 180 degrees. The cavity 12a has a complementary form except that it is tangential from the opposite ends of its 180-degree arc in order to allow a bearing holder to be inserted, or removed, through the front of the cavity. A shoulder 12b of the cavity wall engages a shoulder of the bearing holder to prevent sidewise displacement of the bearing holder by an entering bearing. The inner wall of the bearing holder is lined with the mentioned resilient material to form a C-shaped pocket 13a having a radius closely corresponding to that of the outer ring of the bearing to be entered. The pocket is fully open at both ends and its front opening is less than 180 degrees, eliminating any chances of a bearing therein rolling out. The close fit of the bearing periphery to the pocket and the resiliency of the pocket material prevent accidental endwise shift of the bearing. The difference between bearing holders is essentially in the diametral size of its pocket 13a and the vertical span of the front opening of the pocket, the diametral size depending on the diameter of bearing to be held therein and the span of the front opening substantially exceeding the diameter of the clamp member 11 in the same tool set. To emphasize the difference between bearing holders, FIG. 5 shows a bearing holder, distinguished as 13', with a pocket 13'a for cupping a smaller bearing than the pocket of the bearing holder shown in FIGS. 4 and 4A.

Each bearing holder, before being lined with its pocket 13a, is centrally fitted with a tail or stem 65 having a V notch 65a and tapering down from the notch to the free end. The load arm 12 has a longitudinal hole 66 medially intersecting the cavity 12a and receiving the stem 65 when the bearing holder is inserted in the cavity. A plunger 67 in the load arm is urged by a spring 68 into the hole 66. When the bearing holder is introduced into the cavity 12a, the tapered end of its stem 65 cams the plunger 67 out of the way until the V notch 65a reaches the plunger, whereupon the plunger snaps into the notch to lock the bearing holder releasably but firmly in fully seated position. The load arm also non-rotatively mounts, in suitable openings intersecting the hole 66, a depressible knock-off member 69 urged outwardly by a spring 70 and provided on its outer end with a knob 71. When it is desired to dismount the bearing holder 13, the knock-off member 69 is depressed and an inclined edge 69a thereof cams on the end of stem 65 to snap the bearing holder forwardly out of detention by the plunger 67. Quick change of the bearing holder in load arm 12 is thus provided for.

Fixed on the base F and located between auxiliary frames f and 52 is a casting 74 (FIGS. 1, 2, 14 and 15) having uprights 75 and 76 straddling the head of the load arm 12. The top of upright 75 has an upwardly facing depressed seat 75a for cup member 14. A different cup member is used for each different diameter bearing workpiece, but all the cup members have the same outside form and size to fit in the seat 75a. Merely for convenience of manufacture, the outside form of the cup member and the complementary form of the seat are arcuate. A locating shoulder 75b of the seat abuts a shoulder at the base of a reduced peripheral section of the cup member, the reduced section extending past the seat into close proximity to the left side of the load arm 12 (as viewed in FIG. 1). The cup member 14 is removably locked down on seat 75a in the same way as the bearing holder 13 is locked into the cavity 12a of the load arm. Briefly, the cup member has a tail 77 extending into a hole 78 of upright 75. The tail is formed with a V notch 77a and tapers down from the notch to its free end. A spring-pressed plunger 79 contained in upright 75 is cammed aside by the tapering end portion of the tail 77, when the cup member is moved into its seat 75a, until the V notch 77a reaches the plunger. The plunger then snaps into the notch to retain the cup member in fully seated position. For quick change of cup holders, the upright 75 mounts a depressible outwardly biased knock-off member 80 provided with a hand knob 81. To dismount the cup member 14, the knock-off member is depressed and thereupon acts on tail 77 of the cup member to release it from the plunger 79, allowing the cup member to be removed.

Figures 14, 15:
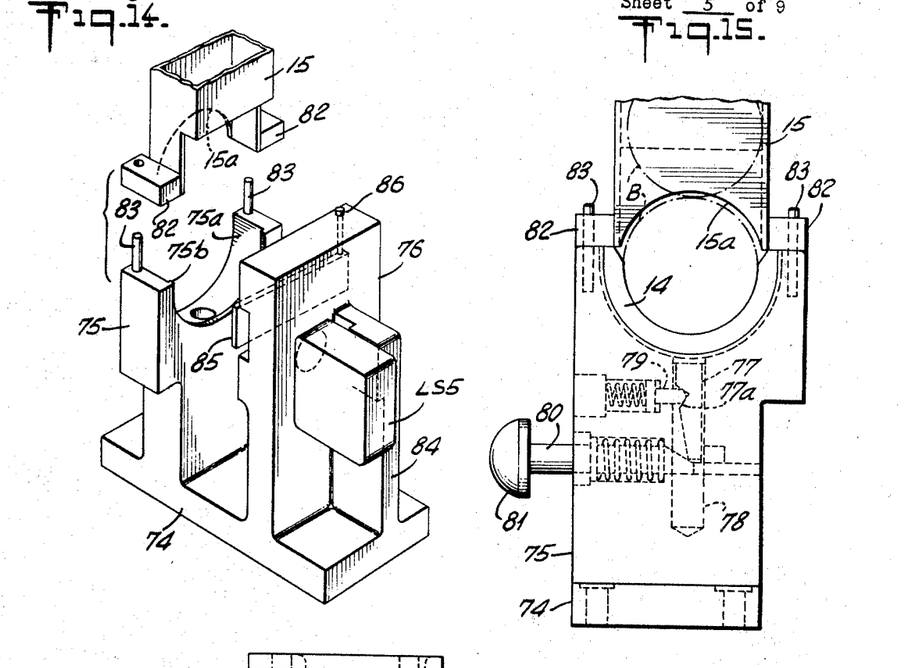
FIG. 14 is a perspective view of an auxiliary frame casting, with a switch unit mounted thereby, and also shows the lower portion of a bearing supply chute adapted to be positioned on the casting.
FIG. 15 is a left side view of the casting, with the supply chute positioned thereon and with a cup member fitted on the casting at the mouth of the chute.

Each cup member has a smooth arcuate inside surface forming the upwardly open C pocket 14a. The pocket is formed on a diameter conforming substantially to the outside diameter of the bearing to be cupped in the pocket. The arc of pocket 14a is limited to 180 degrees and faces the lower end or mouth of the supply chute 15, so that the bottom bearing in the chute will drop into the pocket when the chute mouth is unblocked, beveled ends of the cup member serving to guide the bearing into the pocket.

It is preferred to use a different supply chute 15 for each different diameter of bearing to be run through the machine although, as an alternative, a chute with one or more adjustable sides could be used. Each chute 15 has toes 82 with holes therethrough for freely receiving locating pins 83 extending up from the top of the frame upright 75. The chute is thereby removably located at its lower end in centered position above the matching pocket 14a of the seated cup member 14. Suitable provision is made for detachably holding the chute down on the frame upright 75.

The pocket 14a of cup member 14 is fully open at the side adjacent the load arm 12. At the opposite side, the pocket is accessibly open to the pusher or plunger head 17 of plunger 16. Any suitable form of plunger head may be used but a cylindrical form is preferred. For each different diameter of bearing to be handled by the machine, a plunger head of related diametral size is employed, the diameter of the plunger being somewhat less than that of the diameters on which the pockets of the members 14 and 13, in the same tool set, are formed, so that the plunger head will smoothly move into the pockets. Each plunger head is long enough to block the mouth of supply chute 15 until the plunger head is retracted from the pocket 14a.

The plunger head 17 is force-fitted on the tapered end of plunger rod 16, so that it may be quickly changed. The wall of the chute 15 facing the plunger head is arched upwardly at 15a (FIG. 15) so as not to interfere with entry of the plunger head into the pocket 14a. The opposite wall of the chute is cut away sufficiently to permit egress of a bearing from the pocket 14a. When the load arm 12 is in rear position, pocket 13a of bearing holder 13 is laterally alined with pocket 14a of the cup member 14. The plunger head 17 may then be advanced from a rear position to push a bearing from the cup member into the bearing holder. As the plunger head reaches its front position, it presses the bearing against a lever 85 hinged at 86 to the frame upright 76 for closing a normally open switch LS5 extending into a hole in the upright and attached to a vertical part 84 of the casting 74. Closure of switch LS5 thus manifests the insertion of a bearing into the load arm 12. If the bearing supply has been exhausted, there will be no bearing in cup member 14 and no bearing will be entered in the bearing holder 13 by the plunger, so that switch LS5 will remain open.

If the plunger head 17 is retracted from the pocket 14a while the load arm 12 is still in rear position, there is a possibility that the next bearing dropping from the chute into the pocket 14a may, before settling down, bound toward the load arm and intrude into the pocket 13a of the bearing holder 13. To avoid this possibility, the plunger head is not retracted from the pocket 14a until after the load arm has started its advance and removed pocket 13a from alinement with pocket 14a.

The plunger head 17 thus has three positions; a rear position called position 1, an intermediate position 2 in which the plunger head is retracted from the load arm 12 but is within the pocket 14a and blocking the mouth of chute 15, and a front position 3 in which the plunger head is fully advanced and intruding into pocket 13a. These plunger positions are determined by operation of tandem cylinders #6 and #7 of which the latter has plunger 16 as its piston rod. The operation of the tandem cylinder combination may be understood from the diagrammatic showing in FIG. 19. On actuation of avlve V7, the pressure in the rear chamber of cylinder #7 is effective to advance the plunger 16–17 to front position 3. If valve V6 is also actuated, pressure air is admitted to the rear chamber of cylinder #6 to advance its piston rod to a stop position behind a rear piston rod of cylinder #7. When the valve V7 returns to normal setting, the pressure differential in cylinder #7 is reversed and its piston moves back to the position determined by the advanced piston of cylinder #6. The plunger 16–17 is then in intermediate position 2 and remains there until valve V6 is returned to normal setting. Both chambers of cylinder #6 are then at atmospheric pressure and the pressure air in the front chamber of cylinder #7 becomes effective to move the pistons of both cylinders to the rear, whereby the plunger 16–17 is restored to its rear position 1.

An arm 90 yokes the plunger 16 to a parallel slide 91 which is provided with a cam bar 92 (also see FIG. 1A). The bottom of bar 92 has a cam edge engaged with an operating lever 93 for a normally open switch LS2. When the plunger is in front position 3, the cam of bar 92 permits the switch to remain open. In the intermediate and rear positions of the plunger, the cam acts through follower lever 93 to close the switch LS2.

The pickup PU (FIGS. 1 and 2) is carried by the horizontal arm of a bell crank lever 94 pivoted at 95 to the frame upright 76. The vertical arm of the lever 94 is connected to plunger rod assembly 96 of cylinder #4 which is trunnion-mounted on a bracket 97 attached to upright 76. A spring 98 between the lever and the upright biases the lever counterclockwise (FIG. 2), but the force of the spring is overcome by the normal pressure differential in cylinder #4 which is holding the plunger assembly 96 to the rear. On actuation of valve V4 (FIG. 19), the air pressures in the chambers of cylinder #4 are equalized, permitting the spring 98 to move the pickup PU down into sensing engagement with the periphery of the bearing in test position. A slow leak valve CV is associated with the cylinder and valve V4 to retard the escape of pressure air from the front chamber of the cylinder, in order that the pickup PU move gradually into engagement with the bearing.

The reject cylinder #8 (FIGS. 16 and 19) has a spring-restored piston. When the valve V8 is actuated, the piston moves forward and its piston rod acts through linkage 24 to swing the deflector 23 to reject position. On resetting of valve V8, the deflector and connected elements return under spring force, to their normal setting.

Figure 20:
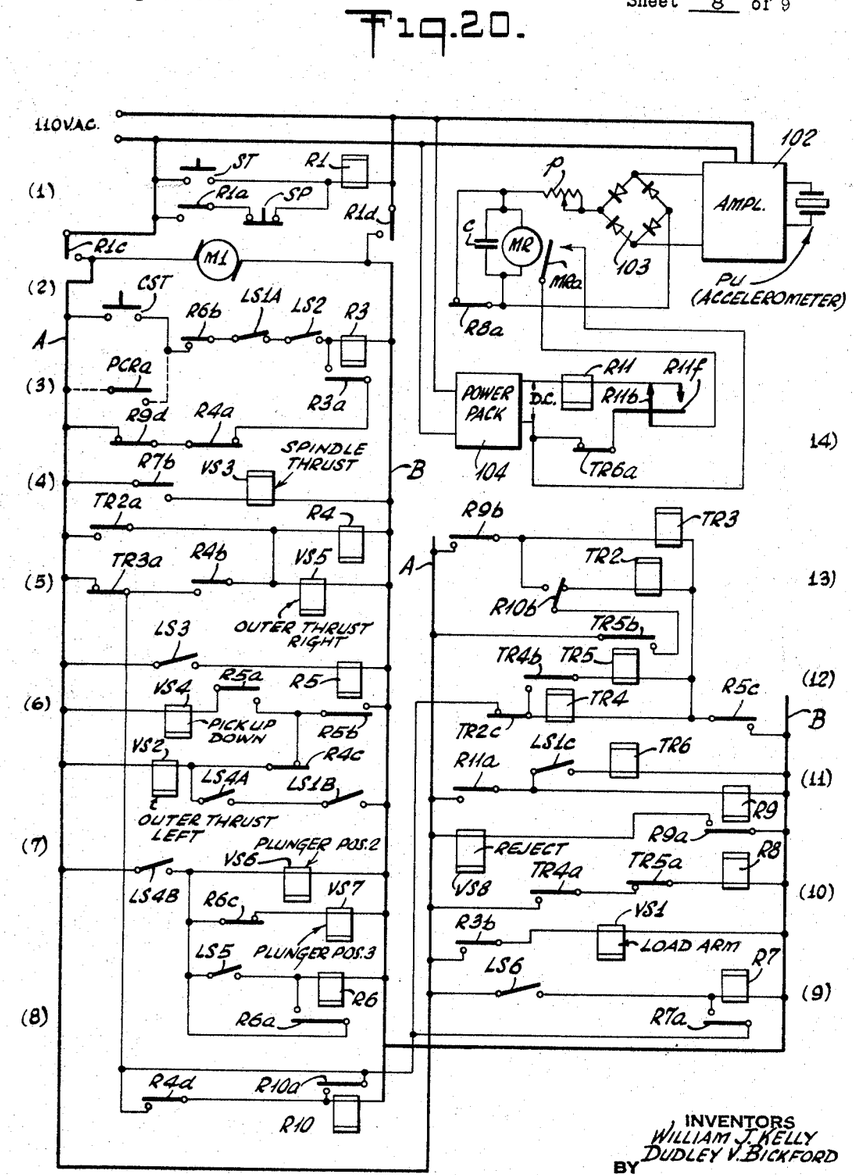
FIG. 20 is a simplified circuit diagram of the machine.
Figure 21:
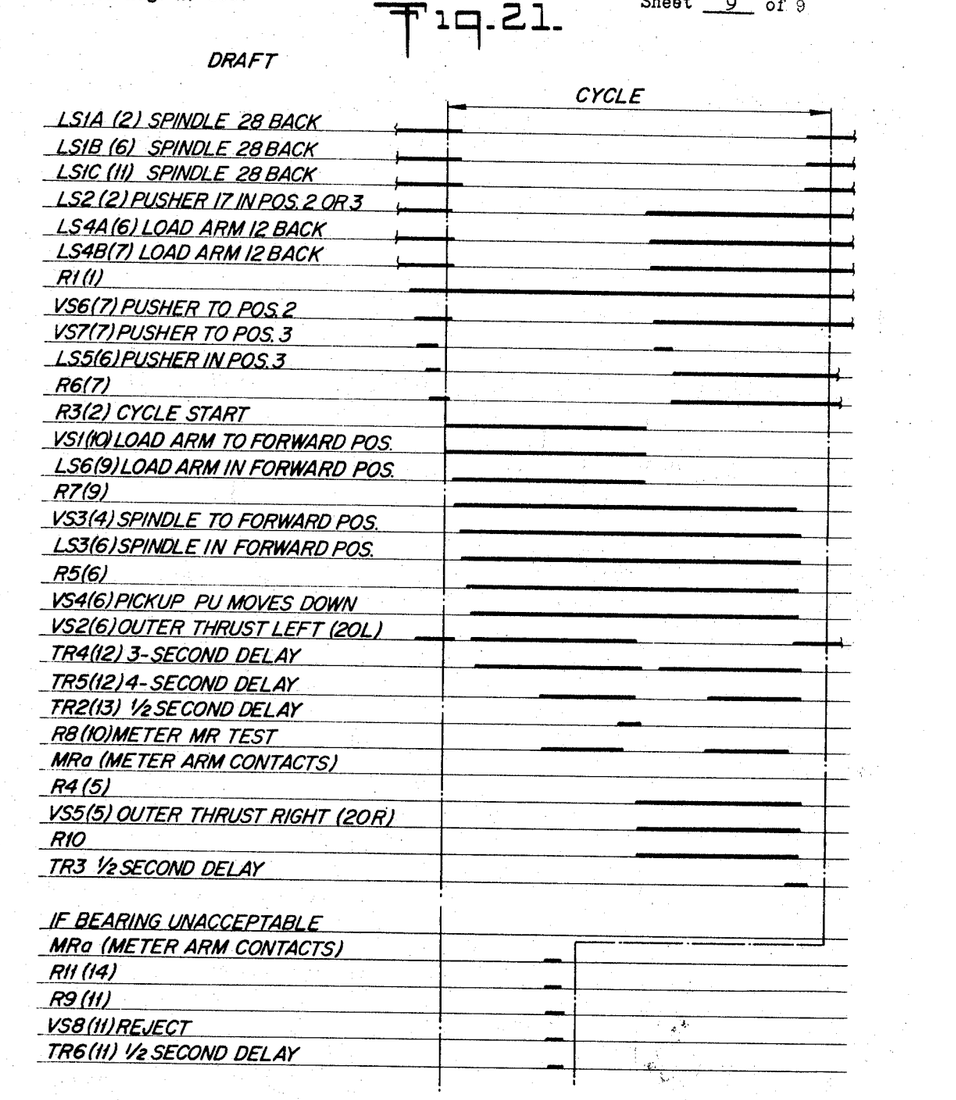
FIG. 21 is an accompanying sequence chart.

The operation of the machine will be explained below, with particular references to a simplified circuit diagram, FIG. 20, and an accompanying sequence chart, FIG. 21. The numbers in parentheses in FIGS. 20 and 21 index the location of certain elements of the circuit. FIG. 21 is merely indicative of the sequence and does not purport to show real time. Certain closure delay relays TR4, TR5, TR2, TR3 and TR6 are used and it is to be understood that the indicated delay times are only illustrative and may be varied within the general timing scheme. To save time, the energization of the valve-actuating solenoids, generally designated VS, will be considered as resulting in the operation of the machine elements driven by the related air cylinders, this being fully justified by the fact that the valves and cylinders are essentially intermediaries through which the solenoids operate these machine elements.

Power, for example, at 110 v. A.C., is supplied from a suitable source, to opposite lines 100 and 101. Power from these lines activates an amplifier 102 to amplify the signals produced by the accelerometer pickup PU and reflecting the sensed bearing vibration. The output of the amplifier is rectified by a rectifier 103 and applied through a threshold value-selecting potentiometer p to a meter MR. Meter MR may be, for instance, a moving coil ammeter and is provided with meter contacts such as arm and segment contacts MRa which engage when the current fed to the meter exceeds the chosen threshold value. A smoothing condenser C across the meter insures an adequate interval of meter response to an applied current pulse. The meter and condenser are shunted by normally closed relay contacts R8a so that the amplifier output will not be effective on the meter until the relay contacts open and remove the short from the meter circuit. In a manner explained later, the relay contacts R8a will be opened during meter test or readout intervals of a machine cycle. During the readout interval, the electrically manifested bearing vibration is sampled by the meter and if it is above the chosen criterion, the meter contacts MRa will close and complete a circuit through a relay R11 by way of back contacts 11b of the relay. In order to avoid reactive influence of the relay current on the meter, this relay is of the D.C. type and receives power from a power pack 104 activated by the A.C. lines 100 and 101.

To initiate machine operation, key contacts ST (1) are closed, energizing relay R1 which locks in through its contacts R1a and stop key contacts SP. Contacts R1c and R1d close and place the power of lines 100 and 101 on opposite circuit lines A and B. As soon as this happens, spin motor M1 starts running. Assuming the load arm 12 is in rear position, the switch LS4B (7) is closed, energized solenoid VS6 and also, through normally closed relay contacts R6c, energizing solenoid VS7. Accordingly, the plunger 16–17 moves to front position 3. If a bearing is in the cup member 14, the plunger shifts it into the load arm, closing switch LS5, so that relay R6 (7) is energized and it opens contacts R6c, dropping solenoid VS7, whereupon the plunger retreats to intermediate position 2. The energized relay R6 locks in through its contacts R6a, shunting switch LS5. Also, relay R6 closes contacts R6b (2) to enable a test cycle to be initiated. If a bearing has not been supplied to cup member 14, then the advance of the plunger 16–17 to front position does not result in closure of switch LS5 (7); hence, relay R6 will not be energized, the contacts R6b (2) remain open, and one condition for initiating a machine cycle will not be satisfied.

Assuming the relay R6 has been energized, it has closed contacts R6b (2). Also, the relay has opened contacts R6c (7), dropping solenoid VS7 whereby the plunger 16–17 has retreated to position 2 as manifested by closure of switch LS2 (2). Assuming, further, that the spindle 28 is in rear position, the switch LS1A is closed. A cycle may now be initiated by closing key contacts CST, energizing relay R3 through R6b, LS1A and LS2. Relay R3 locks in through its contacts R3a and normally closed relay contacts R4a and R9d.

Energized relay R3 closes contacts R3b (10), activating solenoid VS1, so that the load arm 12 is advanced to its forward position. Switch LS4B (7) opens when the load arm leaves its rear position, dropping relay R6 and solenoid VS6. Upon deenergization of VS6, the plunger 16–17 returns to rear position, allowing the next bearing in the supply chute 15 to drop into the cup member 14.

Switch LS4A (6) also opened when the load arm left its rear position and broke a circuit made through solenoid VS2 when power was placed on lines A and B. As VS2 is deenergized, outer thrust left member 20L is retracted.

When the load arm 12 reaches its forward position, it closes switch LS6 (9), energizing relay R7 which sticks through its contacts R7a and normally closed relay contacts TR3a (5). Relay R7 closes contacts R7b (4), activating solenoid VS3, causing the spindle to advance, so that clamp member 11 shifts the bearing from the load arm to test position on the arbor 10.

In the forward position of spindle 28, associated switch LS3 (6) closes and energizes relay R5 which closes contacts R5a and R5b (6) to complete a circuit through valve solenoid VS4, causing the pickup PU to move down on the periphery of the outer ring of the bearing in test position. At the same time as solenoid VS4 is energized, the solenoid VS2 is energized by way of now-closed contacts R5b and normally closed relay contacts R4c. Energization of VS2 causes the outer thrust left member 20L to advance and apply thrust against the right side of the outer ring of the bearing in test position.

Relay R5 also closes contacts R5c (12), establishing the circuit of first timer relay TR4 by way of normally closed relay contacts TR2c and TR3a (5). After a 3-second delay, relay TR4 closes contacts TR4a (10) and the circuit of relay R8 makes via these contacts and normally closed timer relay contacts TR5a. At the same time, the closure of timer relay contacts TR4b (12) has established the circuit of second timer relay TR5. Four seconds later, relay TR5 opens the contacts TR5a (10), dropping the relay R8. Relay R8 is thus energized during the four-second interval between the closure of first timer relay contacts TR4a and the opening of second timer relay contacts TR5a. During this interval, relay R8 opens its contacts R8a so as to remove the short from meter MR which then functions according to the vibration of the bearing in test position. The meter contacts MRa close if the accelerometer PU detects excessive vibration of the bearing. Assuming the vibration is not excessive, meter contacts MRa are open and the cycle proceeds on its regular course.

The timer relay TR5, at the same time as it terminated the meter test interval by opening the circuit of relay R8 (10) also closed contacts TR5b (13) to establish the circuit of timer relay TR2 by way of the normally closed side of transfer relay contacts R10b. After a delay of ½ second, relay TR2 opens its contact TR2c (12) to break the circuits of timer relays TR4 and TR5. Concurrently with the opening of contacts TR2c, the contacts TR2a (5) close and establish circuits through relay R4 and valve solenoid VS5. These lock in via relay contacts R4b and normally closed relay contacts TR3a. It may be noted that when timer relay TR5 was deenergized, its contacts TR5b reopened, so that the circuit of relay TR2 then dropped. Meanwhile, the relay TR2 has brought about the energization of relay R4 and valve solenoid VS5, as explained. Solenoid VS5, when energized, causes the outer thrust right member 20R to advance and apply thrust against the left side of the outer ring of the bearing under test. Energized relay R4 has opened contacts R4c (6), breaking the circuit of solenoid VS2 so that the outer thrust left member 20L retreats as the opposite outer thrust member 20R advances.

Energized relay R4 also opens contacts R4a (4) to break the stick circuit of cycle start relay R3. Further, relay R4 closes contacts R4d (8) to pick up relay R10 which sticks via its contacts R10a and the normally closed relay contacts TR3a (5). Energized relay R10 shifts its contacts R10b (13) to transfer connection of the contacts TR5b from the relay TR2 to the relay TR3.

As the relay R3 has been deenergized, its contacts R3b (10) reopen, whereupon the solenoid VS1 is deactivated. Consequently, the load arm 12 returns to its rear position and closes the switch LS4A–LS4B. Upon closure of the switch points LS4B (7), the solenoids VS6 and VS7 against are energized and the plunger 16–17 advances to front position, transferring the next bearing dropped from the supply chute into the cup member 14 to the bearing holder 13 in the load arm, as manifested by the closure of the switch LS5. Closure of switch LS5, as before, picks up relay R6 which opens contacts R6c to drop the solenoid VS7, so that the plunger 16–17 retires to intermediate position 2 where it remains until the load arm is advanced at the beginning of a next cycle.

The machine is ready to take a reading of the bearing vibration under the thrust being imposed against the left side of the outer ring of the bearing. When the timer relay TR2 was deenergized, contacts TR2c (12) reclosed and, as a result, first timer relay TR4 again is energized, followed, after a delay, by energization of relay R8 and second timer relay TR5. Energized relay R8 opens its contacts R8a again to remove the short from meter MR for a second test interval during the cycle. Assuming the bearing vibration is passable, meter contacts MRa remain open and the cycle proceeds to conclusion. Relay TR5 terminates the test interval and simultaneously closes its contacts TR5b (13). This time, since contacts R10b have been reversed, the timer relay TR3 is energized. After a delay of ½ second, relay TR3 opens contacts TR3a (5) to deenergize relay R4 (5), outer thrust right solenoid VS5 (5), relay R10 (8), relay R7 (9) and the first and second timer relays TR4 and TR5 (12). With solenoid VS5 deenergized, the outer thrust member 20R returns to rear position. As relay R7 is dropped, contacts R7b reopen and deenergize the spindle solenoid VS3 (4). The spindle returns to rear position. As soon as the spindle 28 retreats from its forward position, associated switch LS3 (6) reopens and drops the relay R5; contacts R5a and R5b open and deenergize the solenoid VS4, so that the pickup PU is raised off the bearing in test position.

When the spindle 28 reaches its rear position, associated switch LS1B (6) closes. As the load arm has previously been restored, the switch LS4A already is closed. Accordingly, a circuit again makes through solenoid VS2, causing the thrust left member 20L to advance and knock the tested bearing off the arbor 10 and into the delivery chute 22.

A full test cycle on an acceptable bearing has been described. The machine may be recycled by again closing cycle start key contacts CST (3). In practice, the machine will be automatically recycled under control of means for sensing the passage of a bearing into the delivery chute. Such means may comprise a photocell and associated circuit for closing reday contacts PCRa, in shunt with key contacts CST, when light to the photocell is interrupted by a passing bearing.

It was assumed that the bearing under test was acceptable. Suppose the bearing exhibits excessive vibration under the thrust imposed by the outer thrust left member 20L. Accordingly, the meter MR closes its contacts MRa during the first test interval occurring in the cycle. Closed contacts MRa establish the circuit of relay R11 (14) by way of back contacts R11b. The contacts R11b–R11f are make-before-break contacts and on energization of relay R11, the front contacts R11f close before the back contacts R11b break. The relay R11 then locks in via the front contacts R11f and normally closed relay contacts TR6a. Relay R11 closes contacts R11a (11) to make a circuit through relay R9 which, in turn, closes contacts R9a to energize the solenoid VS8. Solenoid VS8, as previously explained, causes the door 23 (FIG. 16) to swing to position for shutting the passage 22G for accepted bearings and opening the reject passage 22NG.

Relay R9 also closes contacts R9b (13) to complete a circuit through the cycle ending timer relay TR3. After a short delay, contacts TR3a (5) open, breaking the stick circuit of relay R7 (9) and also breaking the circuits of first and second timer relays TR4 and TR5 (12). Deenergization of relay R7 causes its contacts R7b (4) to open, so that solenoid VS3 is deactivated, whereupon the spindle 28 returns to rear position. As the spindle leaves its front position, switch LS3 (6) reopens and drops the circuit of relay R5, so that contacts R5a and R5b open, causing deactivation of solenoid VS4, whereupon the pickup PU rises from the bearing in test position. The opening of contacts R5a also momentarily deenergizes the outer thrust left solenoid VS2. When the spindle reaches its rear position, associated switch LS1B (6) closes and, since the load slide 12 is already in retracted position, the switch LS4A also is closed. Thus, the circuit of outer thrust left solenoid makes now through switches LS4A and LS1B and the member 20L advances to knock the bearing off the arbor.

On return of the spindle to rear position, switch LS1C (11) closes and with relay contacts R11a also closed, timer relay TR6 is energized. After a delay in the order of ½ second, contacts TR6a in the stick circuit of relay R11 (14) open and the relay is deenergized. In turn, contacts R11a reopen and break the circuits of relays R9 and TR6. Contacts R9b (13) open to deenergize relay TR3 and contacts R9a (11) reopen to drop the Reject solenoid VS8.

The same reject sequence as described for a bearing found unacceptable during the first test interval of a cycle takes place if a bearing is found unacceptable during the second test interval of a cycle.

It may be noted that when relay R9 is energized, it opens normally closed contacts R9d in the stick circuit of relay R3 (3) so that recycling may not occur until after TR3 has been energized and, after a delay, has broken the circuit of R9.

Although we have described the invention in detail in connection with the preferred form illustrated, it will be understood that modifications may be made without departing from the spirit and scope of the invention as defined in the claims which follow.

We claim:

1. In a machine to test ball bearings or the like; means for spinning one of the inner and outer rings of a bearing in test position; electrical means, including a vibration transducing pick-up sensing the other of the bearing rings, for manifesting vibration of the bearing with said other ring stressed; a pair of members alternatively engageable, one at a time, with respective opposite sides of said other ring to apply stress thereto; and means for automatically sequentially effecting engagement of said members with said other ring in successive first and second test intervals and in successive opposite directions, whereby the latter ring is stressed exclusively by one member during the first interval in a first direction and exclusively by the other member during the second interval in a second direction.

2. In a machine as in claim 1, and threshold-detecting means responsive to manifestation by said electrical means of bearing vibration exceeding a predetermined threshold during the first test interval for terminating the test of the bearing and skipping the second interval of test thereon.

3. In a machine as in claim 1, and threshold-detecting means responsive to manifestation by said electrical means of bearing vibration exceeding a predetermined threshold during the first test interval for ejecting the bearing from test position and omitting the second interval of test thereon.

4. In a machine as in claim 1, and threshold-detecting means responsive to manifestation by said electrical means of vibration exceeding a predetermined threshold during either of the test intervals for rejecting the bearing.

5. In apparatus to test ball bearings or the like; means to spin the inner ring of a bearing in test position; electrical means, including a vibration transducing pickup, for manifesting vibration of the bearing with its outer ring stressed; a plurality of members individually movable for engagement, one at a time, with the outer ring to apply stress thereto; means for moving a first of said members into stressing engagement with a first part of the outer ring during a first test interval, and means automatically effective following the first test interval for retracting said first member and advancing a second of the members into stressing engagement with a different part of the outer ring during a second test interval.

6. In apparatus to test ball bearings or the like; means to spin the inner ring of a bearing in test position; electrical means, including a vibration transducing pickup, for manifesting vibration of the bearing with its outer ring stressed; a pair of thrust members individually movable in relatively different directions into stressing engagement with the outer ring, means for moving a first of the members into engagement with the outer ring to stress it in one direction during a first test interval, and means automatically effective following the first interval for retracting said first member and moving the other member into engagement with the outer ring to stress it in a different direction during a second test interval.

7. In apparatus as in claim 6, said thrust members being side thrust members respectively facing opposite sides of the outer bearing ring in test position, and a holder for each member movable toward the side of the outer ring facing the member for applying the thrust of the member against the facing side of the outer ring, whereby the outer ring is stressed laterally in one direction during the first test interval and in the opposite direction during the second interval.

8. In apparatus as in claim 7, the holders and thrust members being so constructed as to enable either thrust member to be mounted to either holder.

9. In apparatus as in claim 7, and means slidably guiding the holders for movement parallel to the spin axis of the inner bearing ring.

10. In apparatus as in claim 9, the respective means for moving the relatively opposing thrust members into successive engagement with the outer bearing ring comprising fluid pressure cylinders respectively associated with the holders for the thrust members.

11. Equipment to test ball bearings or the like; comprising means including a rotatable inner-ring support to spin the inner ring of a bearing in test position, said support including resilient means to directly contact the inner ring; electrical means, including a vibration transducing pickup, for manifesting vibration of the bearing with a side thrust applied to its outer ring; and means to apply the side thrust including an outer thrust member movable toward a presented side of the outer bearing in test position, the thrust member being provided on its face with spaced resilient projections for spaced thrust engagement with the presented side of the outer bearing ring.

12. In a machine to test ball bearings or the like; means including a rotatable inner-ring support to spin the inner ring of a bearing in test position, said support including resilient means to directly contact the inner ring; electrical means, including a vibration transducing pickup, for manifesting vibration of the bearing in test position under side thrust on its outer ring; and means for applying such thrust, the latter means including a thrust member mounted for advance toward a presented side of the outer bearing ring in test position, and means for effecting such advance of the thrust member from a rear position, the thrust member comprising an annulus confronting a presented side of the outer bearing ring in test position and concentric about the spin axis of the inner bearing ring, the annulus being made of resilient material for direct engagement with said side of the outer bearing ring upon advance of the thrust member; said resilient means and said resilient annulus being the only elements contacting the inner and outer bearing rings, aside from said pickup, during a vibration test of the bearing under side thrust.

13. In apparatus to test ball bearings or the like; means including a rotatable inner-ring support to spin the inner ring of a bearing in test position, said support including a holder and an inner-ring engaging member readily disengageable therefrom; means, including a vibration transducing pickup, for electrically manifesting vibration of the bearing in test position under side thrust on its outer ring; and means for applying the side thrust comprising a thrust member, a holder mounting the thrust member opposite a presented side of the outer bearing ring in test position, said thrust member coaxially surrounding said inner-ring support, and means for actuating the holder to advance the thrust member into engagement with said side of the outer bearing ring, the holder and the thrust member being provided with readily disengageable means to mount the thrust member to the holder.

14. In apparatus to test a ball bearing or the like while its inner ring is spinning; rotatable inner-ring support means; means, including a vibration transducing pickup, for electrically manifesting vibration of the bearing under side thrust on its outer ring; means for applying the side thrust comprising a thrust member, a movable holder mounting the thrust member opposite a presented side of the outer bearing ring, and means for advancing the holder to engage the thrust member with said side of the outer bearing ring, the thrust member having a ring body and the holder having an annular front socket into which the ring body is removably fitted, said holder and ring body coaxially surrounding said inner-ring support means.

15. In apparatus to test a ball bearing or the like while its inner ring is spinning; means, including a vibration transducing pickup, for electrically manifesting vibration of the bearing under side thrust on its outer ring; and means for applying the side thrust comprising a thrust member, a movable holder mounting the thrust member opposite a presented side of the outer bearing ring, and means for advancing the holder to engage the thrust member with said side of the outer bearing ring, the thrust member having a ring body and the holder having an annular front socket into which the ring body is removably fitted, the engagement between the thrust member and the outer bearing ring being afforded by means on the face of the ring body of the thrust member and radially sized according to the radial dimensions of the outer bearing ring and so as to clear the concentric inner bearing ring when engaged with the outer ring, different thrust members being required for different radial dimensions of the ring of the bearing to be tested, each of the different thrust members differing in the radial dimensions of its outer ring engaging means, and all the thrust members having a ring body sized and formed for similar fit into the front holder socket, whereby the different thrust members may be interchangeably mounted in the holder.

16. In apparatus as in claim 15, the outer ring engaging means of each thrust member being made of resilient material bonded to the face of the ring body.

17. In apparatus as in claim 15, and releasable snap lock means provided between the annular wall of the holder socket and the periphery of the ring body of each thrust member to enable a thrust member to be snapped into or out of releasably locked position in the holder socket.

18. In apparatus as in claim 17, the snap lock means comprising a plurality of spring-plunger units radially disposed in the annular wall of the holder socket and spaced around the socket, each of the plungers being spring-pressed to intrude into the socket, and the ring body of each thrust member being peripherally recessed for engagement with the intruding ends of the plungers, whereby upon insertion of a thrust member into the socket of the holder the plungers snap into detaining coaction with the thrust member.

19. In apparatus as in claim 18, the ring body of the thrust member protruding from the holder socket and formed on the protruding portion with a shoulder adapted for engagement by a knock-off tool by means of which the thrust member may be forced forwardly from the socket and out of detention by the plungers.

20. In apparatus to test ball bearings or the like; electrical means, including a vibration transducing pickup, for manifesting vibration of a bearing in test position while its inner ring is spinning and its outer ring is acted on by a restraining force; a device for applying such restraining force on the outer bearing ring, and rotating means provided with rubber-like material through which the inner bearing ring is mounted for spin-receiving drive by the rotating means, the rubber-like material cushioning the effect on the inner ring of machine vibrations and other extraneous vibrations, without inhibiting vibration of the bearing under the restraining force applied by said device to the outer bearing ring.

21. In apparatus to test ball bearings or the like; means, including a motor-driven arbor, for mounting a bearing in test position with its inner ring on the arbor and effectively locked thereto for non-slip rotation therewith; electrical means, including a vibration transducing pickup, for manifesting vibration of the bearing while its inner ring is rotating with the arbor and its outer ring is restrained by an applied load; and selectively reversible means for applying such load to the outer bearing ring, the latter means comprising first and second members mounted for opposite directions of movement to and from the outer bearing ring and means for sequentially moving said members toward the outer bearing ring to impose a restraining force thereon.

22. In apparatus to test ball bearings or the like; means, including a motor-driven arbor, for mounting a bearing in test position with its inner ring on the arbor and effectively locked thereto for non-slip rotation therewith; electrical means, including a vibration transducing pickup, for manifesting vibration of the bearing while its inner ring is rotating with the arbor and its outer ring is restrained by an applied load; and means for selectively reversibly applying such load to the outer bearing ring, the latter means comprising a member mounted for movement to and from the outer bearing ring and means for moving the member toward the outer bearing ring to impose a restraining force thereon, the arbor being provided with a concentric clamp element for abutting a side of the inner ring on the arbor, and the first named means further including a clamp member coaxially confronting said clamp element and axially movable into clamping engagement with the opposite side of the inner bearing ring on the arbor, whereby the inner bearing ring is clamped for effective reaction regardless of the instantaneous direction of load applied to the outer bearing ring.

23. In apparatus to test ball bearings or the like; means, including a motor-driven arbor, for mounting a bearing in test position with its inner ring on the arbor and effectively locked thereto for non-slip rotation therewith; electrical means, including a vibration transducing pickup, for manifesting vibration of the bearing while its inner ring is rotating with the arbor and its outer ring is restrained by an applied load; and means for applying such load to the outer bearing ring, the latter means comprising a member mounted for movement to and from the outer bearing ring and means for moving the member toward the outer bearing ring to impose a restraining force thereon, the arbor having fixed thereon a flanged collar of resilient material, the hub of the collar fitting into the center hole of the inner bearing ring in test position and the collar flange constituting an abutment for one side of the inner ring, the first named means further including an axially movable clamp member coaxially confronting the arbor and having an annular face made of said resilient material for abutting the opposite side of the inner ring on the collar hub, whereby the inner bearing ring in test position is engaged centrally and at its opposite sides with said resilient material, the resilient material cushioning the effect on the inner ring of machine vibrations and other extraneous vibrations, without inhibiting bearing vibration resulting from the load applied to the outer bearing ring.

24. In a machine to test ball bearings or the like; a shaft rotatable about a test axis, a bearing carrier for bringing a bearing to a position in which it is axially aligned with and in front of the shaft, a reciprocable device movable from a rear position to a front position for engaging the bearing brought in front of the shaft and pushing the bearing onto the shaft and into test position in which the inner ring of the bearing is rotatable with the shaft, switch means signaling the arrival of the reciprocable device in its front position, a vibration transducing pickup for sensing the outer bearing ring in test position, and means controlled by said switch means upon arrival of the reciprocable device in front position for moving the pickup into sensing engagement with the outer bearing ring.

25. In a machine as in claim 24, a thrust member effective upon advance toward the outer bearing ring in test position to apply stress thereto, and means also controlled by the switch means for effecting the advance of the thrust member.

26. In a machine as in claim 24; an outer thrust member at the side of the bearing in test position remote from said reciprocable device, means for advancing the thrust member to engage and apply side thrust against the confronting side of the outer bearing ring, the resulting lateral force on the bearing being resisted by said device while in its front position, and means for returning said device to its rear position at completion of the test on the bearing, said thrust member then being rendered effective by application of side thrust on the outer bearing ring in test position to knock the bearing off the shaft.

27. In a machine for testing a ball bearing or the like; electrical means to manifest vibration of the bearing while its inner ring is spinning and its outer ring is stressed, said electrical means including a vibration transducing pickup movable from a withdrawn position into sensing engagement with the outer bearing ring, means whereby the pickup is biased toward the outer bearing ring, a fluid-pressure responsive device for normally opposing the influence of the biasing means; and means for gradually reducing the fluid pressure in said fluid-pressure responsive device, whereby the biasing means is effective to move the pickup gently into engagement with the outer bearing ring.

References Cited

UNITED STATES PATENTS

| | | | |
|---|---|---|---|
| 2,763,152 | 9/1956 | Birdsall | 73—67 |
| 2,787,905 | 4/1957 | Prestipino et al. | 73—67 |
| 3,095,730 | 7/1963 | Matheson | 73—67 |
| 3,287,966 | 11/1966 | Haan et al. | 73—67 XR |

RICHARD C. QUEISSER, *Primary Examiner.*

JOHN P. BEAUCHAMP, *Assistant Examiner.*